US008475117B2

(12) United States Patent
Andrew

(10) Patent No.: US 8,475,117 B2

(45) Date of Patent: Jul. 2, 2013

(54) GAS TURBINE COMPRESSOR AND METHOD OF OPERATION

(75) Inventor: Philip L. Andrew, Greenville, SC (US)

(73) Assignee: General Electric Company, Schenectady, NY (US)

( * ) Notice: Subject to any disclaimer, the term of this patent is extended or adjusted under 35 U.S.C. 154(b) by 901 days.

(21) Appl. No.: 12/615,288

(22) Filed: Nov. 10, 2009

(65) Prior Publication Data

US 2011/0110758 A1 May 12, 2011

(51) Int. Cl.
*F01D 7/00* (2006.01)

(52) U.S. Cl.
USPC .......................................... 415/130; 60/39.53

(58) Field of Classification Search
USPC ................................. 415/130; 60/39.53, 775
See application file for complete search history.

(56) References Cited

U.S. PATENT DOCUMENTS

| | | | | |
|---|---|---|---|---|
| 6,582,195 | B2 | 6/2003 | Davidson | |
| 7,165,935 | B2 | 1/2007 | Buehler et al. | |
| 7,293,415 | B2 | 11/2007 | Hoffmann et al. | |
| 7,310,950 | B2 | 12/2007 | Dovali-Solis et al. | |
| 2005/0028530 | A1 | 2/2005 | Doebbeling et al. | |
| 2008/0247885 | A1 * | 10/2008 | Hagen | 417/244 |
| 2008/0251165 | A1 * | 10/2008 | Arrell et al. | 148/622 |
| 2009/0205340 | A1 | 8/2009 | Bolis et al. | |

* cited by examiner

*Primary Examiner* — Dwayne J White

(74) *Attorney, Agent, or Firm* — Sutherland Asbill & Brennan LLP

(57) ABSTRACT

The present application provides a compressor for a gas turbine. The compressor may include a number of rotor wheels positioned about a compressor aft section having a low alloy material, a number of inlet guide vanes positioned about a compressor inlet section, and a wet compression system positioned about the compressor inlet section.

19 Claims, 3 Drawing Sheets

GAS TURBINE COMPRESSOR AND METHOD OF OPERATION

TECHNICAL FIELD

The present application relates generally to gas turbine engines and more particularly relates to gas turbine compressors and methods of operating the same over varying temperatures so as to provide a level power output.

BACKGROUND OF THE INVENTION

The mass flow rate of air through the compressor of a gas turbine engine generally varies as a function of the ambient temperature. On hot days, the density of the air may decrease by about ten percent (10%) to about twenty percent (20%) as compared to a standard ISO day ("International Organization for Standardization") of about 59 degrees Fahrenheit (about 15 degrees Celsius). As such, the overall power produced by the gas turbine engine also may be reduced by about ten percent (10%) to about twenty percent (20%) or so. This reduction in output, however, generally coincides with higher consumer and industrial power demands due to increased air conditioning loads and the like. As a result, the combination of elevated power demands and reduced generation capacity may elevate power prices by a multiple of ten or more as compared to normal power demands and capacity during a lower temperature day.

Attempts to increase power generation on hot days have included increasing the size of the compressor to compensate for the lost flow rate. The increased scale, however, also may result in increased costs. Moreover, increased temperatures on warmer days may lead to increased compressor pressures and temperatures. Such increased pressures and temperatures generally require the use of expensive nickel based alloys at least in the aft section of the compressor so as to provide durability against low cycle fatigue. These alloys, however, may be relatively expensive as compared to standard gas turbine components.

Various types of water cooling methods also have been used. For example, inlet fogging about the compressor inlet may reduce the compressor inlet air temperature. Such a reduction in air temperature generally restores the mass flow rate and thus the generated power. Inlet fogging, however, generally is only useful until the wet bulb temperature is reached such that the practice has limited utility on humid days. Wet compression involving a spray of water inside the compressor inlet also has been used. Latent heat for the evaporation of the water cools the inlet air stream so as to increase the power available due to the reduction of work required for compression of the inlet air. The addition of the water stream, however, may have thermal stress and/or erosion issues.

There is thus a desire for an improved compressor and methods of operating the same so as to provide a constant level of power generation across the ambient temperature operating range, particularly on hot days. Such constant power generation would allow power producers to meet power generation requirements during periods of both high demand and hence high profitability. The compressor and methods thus should be temperature flexible while maintaining high levels of efficiency and durability.

SUMMARY OF THE INVENTION

The present application thus provides a compressor for a gas turbine. The compressor may include a number of rotor wheels positioned about a compressor aft section having a low alloy material, a number of inlet guide vanes positioned about a compressor inlet section, and a wet compression system positioned about the compressor inlet section.

The present application further provides for a method of operating a compressor in varying ambient temperatures so as to maintain a level power output. The method may include the steps of positioning a number of inlet guide vanes in an extended position until a predetermined ambient design condition temperature is reached, modulating the inlet guide vanes to an open position when the ambient temperature exceeds the predetermined ambient design condition temperature, and operating a wet compression system when the ambient temperature exceeds the predetermined ambient design condition temperature.

The present application further provides for a compressor for a gas turbine. The compressor may include a number of rotor wheels with a number of oversized rotor blades positioned about a compressor aft section, a number of inlet guide vanes positioned about a compressor inlet section, and a wet compression system positioned about the compressor inlet section.

These and other features and improvements of the present application will become apparent to one of ordinary skill in the art upon review of the following detailed description when taken in conjunction with the several drawings and the appended claims.

DETAILED DESCRIPTION

Figure 1:
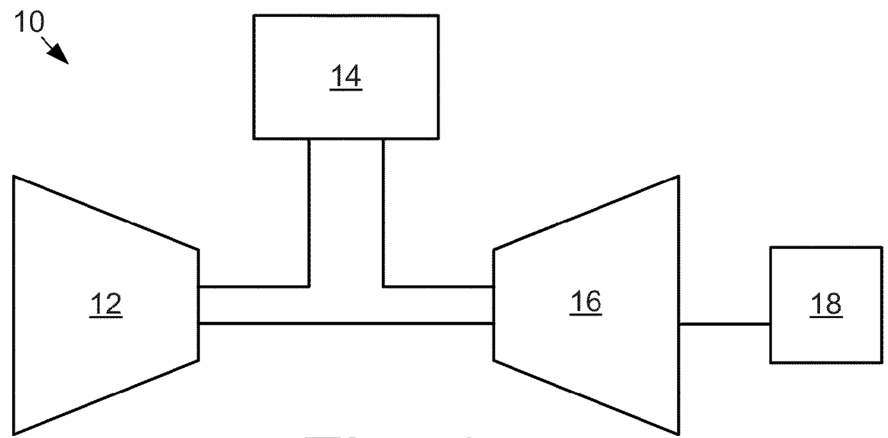
FIG. 1 is a schematic view of a gas turbine engine.

Referring now to the drawings, in which like numerals refer to like elements throughout the several views, FIG. 1 shows a schematic view of a gas turbine engine 10. As is known, the gas turbine engine 10 may include a compressor 12 to compress an incoming flow of air. The compressor 12 delivers the compressed flow of air to a combustor 14. The combustor 14 mixes the compressed flow of air with a compressed flow of fuel and ignites the mixture. Although only a single combustor 14 is shown, the gas turbine engine 10 may include any number of combustors 14. The hot combustion gases are in turn delivered to a turbine 16. The hot combustion gases drive the turbine 16 so as to produce mechanical work. The mechanical work produced in the turbine 16 drives the compressor 12 and an external load 18 such as an electrical generator and the like.

The gas turbine engine 10 may use natural gas, various types of syngas, liquid fuels, and other types of fuels. The gas turbine engine 10 may be an F Class engine offered by General Electric Company of Schenectady, N.Y. or similar designs. The gas turbine engine 10 may have other configurations and may use other types of components. Other types of gas turbine engines may be used herein. Multiple gas turbine engines 10, other types of turbines, and other types of power generation equipment may be used herein together.

Figure 2:
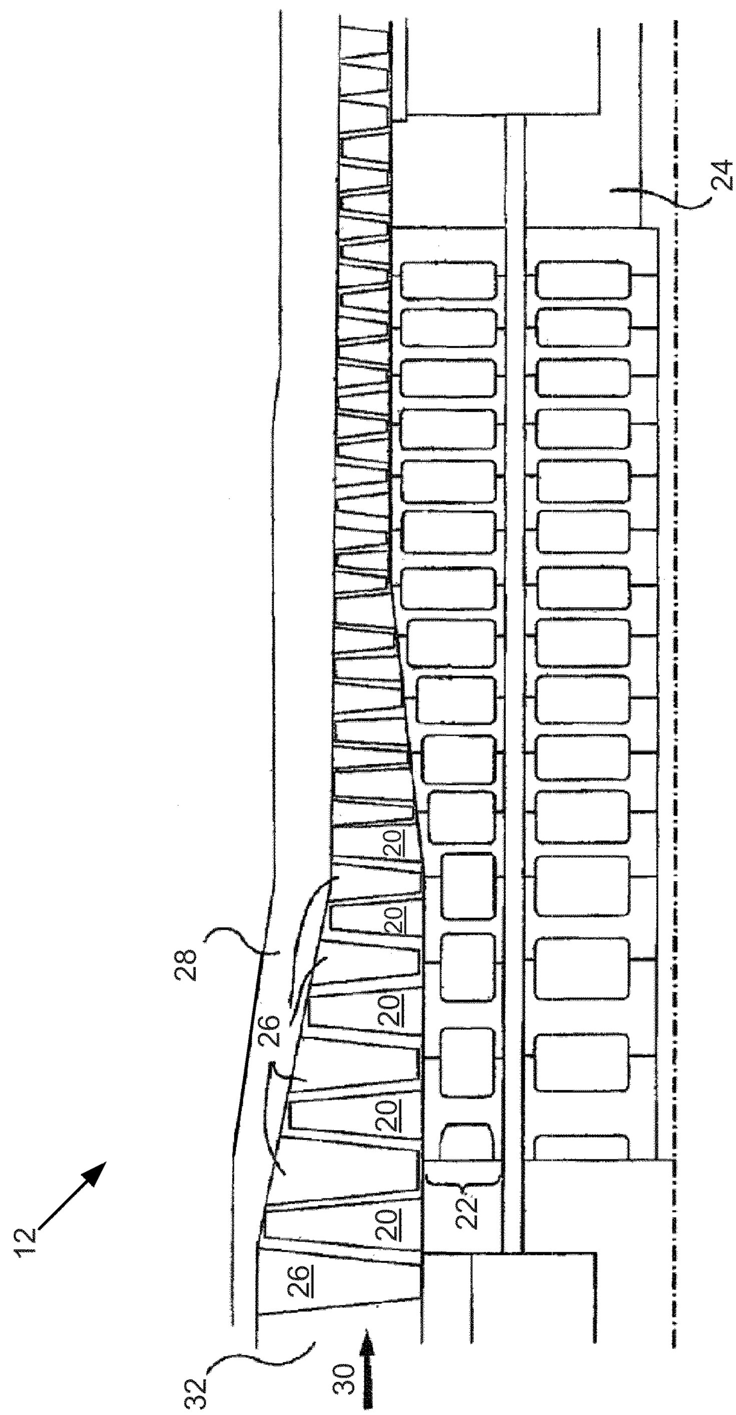
FIG. 2 is a perspective exemplary view of a compressor flow path through a compressor.

FIG. 2 shows an example of the compressor 12. The compressor 12 may include a number of circumferentially spaced rotor blades 20 mounted on a rotor wheel 22. Each of the rotor wheels 22 may be attached to a driveshaft 24. The driveshaft 24 may be connected to the turbine 16. A number of circumferentially spaced stator blades 26 may be attached to a static compressor casing 28. The rotor blades 20 and the stator blades 26 lie in a flow path 30 beginning at a compressor inlet 32 in a staggered configuration.

Figure 3:
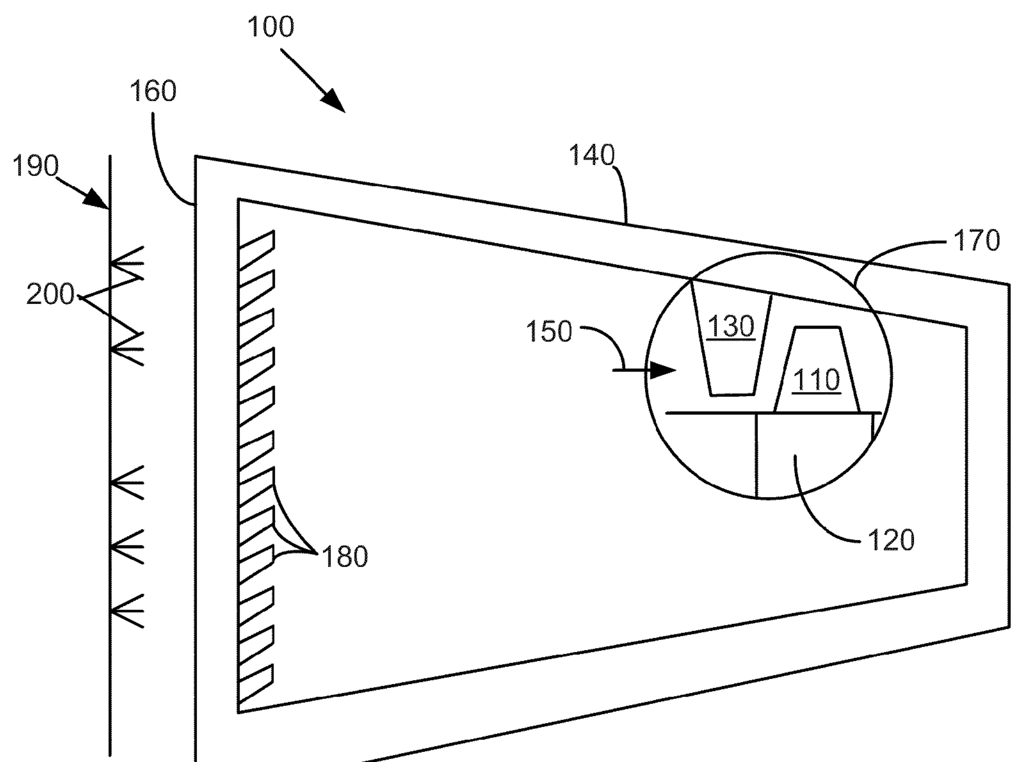
FIG. 3 is a schematic view of a compressor as is described herein.

FIG. 3 shows a schematic view of a compressor 100 as may be described herein. Similar to the compressor 12 described above, the compressor 100 may include a number of rotor blades 110 attached to a rotor wheel 120 and a number of stator blades 130 attached to a compressor casing 140. The compressor 100 also defines a flow path 150 extending therethrough from a compressor inlet section 160 to a compressor aft section 170. Many other types of compressor 100 designs and components may be used herein. The compressor 100 may have any desired size. The compressor 100 described herein also may be used in other types of simple cycle or combined cycle power generation devices.

The compressor 100 may be considered "oversized", i.e., if the operation of the overall gas turbine engine 10 declines by about ten percent (10%) to about twenty percent (20%) on a hot day, the size of the compressor 100 may be increased to provide about ten percent (10%) to about twenty percent (20%) more mass air flow rate therethrough. The rotor blades 110, the stator blades 130, and other components of the overall compressor 100 thus may be oversized as compared to typical compressor components.

The compressor 100 also may have a number of inlet guide vanes 180 positioned about the compressor inlet section 160. The angle of the inlet guide vanes 180 may be variable. The angle may vary from a fully open position with little blockage or swirl to a fully extended or angled position of up to about five degrees) (5°) to about fifteen degrees) (15°). Other angles may be used herein. The angle of the inlet guide vanes 180 thus may vary according to the ambient conditions and the desired operating conditions as is described in more detail below. Any number or size of the inlet guide vanes 180 may be used herein. We note that the compressor 100 also may have variable stator vanes used to provide flow modulation as well. For the purposes of clarity, only the inlet guide vanes 180 are shown herein.

The compressor 100 also may include a wet compression system 190. The wet compression system 190 may include a number of spray heads 200 positioned about the compressor inlet section 160. Any number of spray heads 200 may be used. The wet compression system 190 and the spray heads 200 may be any type of water injection system. The wet compression system 190 injects a water droplet fog into the compressor inlet section 160 or otherwise such that the evaporation of the water reduces the compressor inlet temperature and hence the work required for compression. Mid-compressor injection also may be used herein. Specifically, water injection may be provided after several stages of compression.

In use, the inlet guide vanes 180 may be fully extended (i.e., angled) on a design condition day. The design condition is that predetermined ambient temperature to which the compressor 100 is designed for highest efficiency. The design condition day may be the ISO standard of about 59 degrees Fahrenheit (about 15 degrees Celsius) or otherwise. The inlet guide vanes 180 may be fully open on under hot day conditions. The hot day conditions may be about 110 degrees Fahrenheit (about 43.3° degrees Celsius) or otherwise above the design condition day temperatures. The inlet guide vanes 180 generally are fully extended on the design condition day so as to reduce the airflow to the oversized compressor 100 and fully opened on the hot day so as to provide as much airflow as is possible. The angle of the inlet guide vanes 180 thus may be varied with ambient temperatures and the overall operating conditions of the compressor 100.

The compressor 100 also may use the water compression system 190 when the inlet guide vanes 180 are fully opened on a hot day and otherwise above the design condition day temperatures. The spray heads 200 of the wet compression system 90 inject the water droplet fog into the compressor inlet section 160, mid-section, or otherwise so as to reduce the work of compression and hence the compressor discharge temperature.

The compressor 100 likewise may be oversized as compared to known compressors so as to overcome the reduction in power caused by a reduction in air density on a hot day. As described above, increased compressor discharge pressures and discharge temperatures generally may require the use of nickel based alloys for the components thereof. The use of the water compression system 190 on hot days thus allows for the use of lower cost "low alloy" materials for the rotor wheel 120 and perhaps other components of the compressor 100 given the minimized compressor discharge temperatures, particularly in the compressor aft section 170. For example, a low alloy NiCrMoV material, i.e., materials with a low alloy content, and similar types of materials with good creep resistance may be used herein.

A balance may be found between how much power augmentation may be provided by opening the inlet guide vanes 180 for more airflow and how much via the wet compression system 190. Generally, modulation of the angle of the inlet guide vanes 180 may be used until the inlet guide vanes 180 are completely open. The wet compression system 190 likewise may be employed while the inlet guide vanes 180 are being modulated or when the vanes are open. The water compression system 190 serves to limit the stress and erosion issues associated with wet compression. Too much airflow without wet compression, however, may cause the compressor discharge pressure and temperature to be elevated which may promote creep. The angle of the inlet guide vanes 180 and the operation of the wet compression system 190 thus may be coordinated in the context of the compressor discharge pressure and temperature limits.

A standard micro-controller 210 or an existing controller for the gas turbine engine 10 as a whole may control the operation of the inlet guide vanes 180 and the wet compression system 190 in the context of the ambient conditions so as to maximize or level the overall power generation. The micro-controller 210 may be of conventional design. For example, the inlet guide vanes 180 may be in an extended position during the ambient design condition day but moved to an open position when the ambient conditions begin to approach hot day conditions. Likewise, the wet compression system 190 may be used as the ambient conditions begin to approach hot day conditions or otherwise above the design condition day temperatures.

The compressor 100 herein thus maintains level power generation even on hot days when power prices are at their maximum through the use of an oversized compressor 100, the inlet guide vanes 180, and the wet compression system 190. The use of the wet compression system 190 also may improve the simple cycle heat rate while not impairing the combined cycle heat rate. The compressor 100 also avoids the need for the use of high cost nickel alloys.

Figure 4:
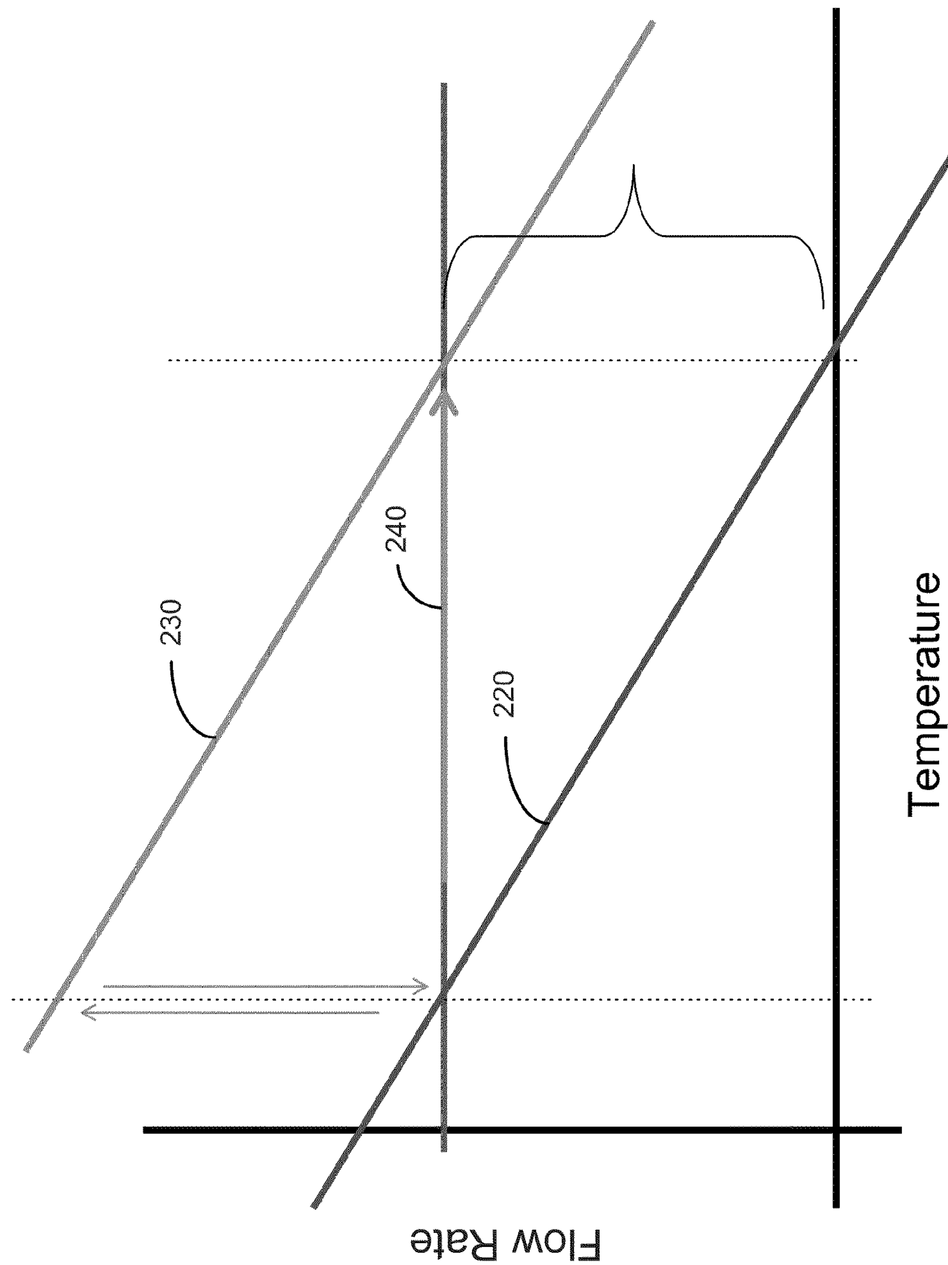
FIG. 4 is a chart showing a level power output as may be provided with the compressor described herein.

FIG. 4 show the operation of the compressor 100 as is described herein in the context of flow rate, temperature, and power output. First output line 220 shows the operation of a known compressor 12. As the temperature increases, the power output declines as the flow rate declines. As is shown in second output line 230, increasing the size of the compressor 100 increases the power. Such increased power output, however, may result in increased compressor temperatures and pressures such that the more expensive alloy components may be required.

The controller 210 herein balances the power output with the operation of the inlet guide vanes 180 and the wet compression system 190 so as to provide the level output line 240. Specifically, the inlet guide vanes 180 are closed on a design condition day to maintain the desired flow rate. The inlet guide vanes 180 are then modulated open as the temperature increases. The controller 210 likewise operates the wet compression system 190 as the temperature increases to maintain the level output line 240. Other types of power output targets may be accomplished herein with the compressor 100 and the like.

Moreover, the controller 210 also may balance the suppression of the compressor discharge temperature and the resultant power output increase with the potential for blade erosion and other potential types of damages. More specifically, the controller may balance the output benefits and the potential damage drawbacks in the context of the current price of power. In other words, the price of the power output may justify taking more of a damage risk so as to maintain the stability of the grid. Other parameters may be evaluated herein.

It should be apparent that the foregoing relates only to certain embodiments of the present application and that numerous changes and modifications may be made herein by one of ordinary skill in the art without departing from the general spirit and scope of the invention as defined by the following claims and the equivalents thereof.

I claim:

1. A compressor for a gas turbine, comprising:

a plurality of rotor wheels positioned about a compressor aft section;

the plurality of rotor wheels comprising a low alloy material;

a plurality of inlet guide vanes positioned upstream of a compressor inlet section;

a wet compression system positioned about the compressor inlet section; and a plurality of stator blades downstream of the plurality of inlet guide vanes.

2. The compressor of claim 1, further comprising a plurality of rotor blades attached to the rotor wheel.

3. The compressor of claim 1, wherein the plurality of inlet guide vanes are capable of an open position and a fully extended position.

4. The compressor of claim 1, wherein the wet compression system comprises a plurality of spray heads.

5. The compressor of claim 1, further comprising a controller in communication with the plurality of inlet guide vanes and the wet compression system.

6. The compressor of claim 1, wherein the low alloy material comprises a NiCrMoV material.

7. The compressor of claim 1, wherein the low alloy material comprises a creep resistant material.

8. A method of operating a compressor in varying ambient temperatures so as to maintain a level power output, comprising:

positioning a plurality of inlet guide vanes in an extended position until a predetermined ambient design condition temperature is reached;

modulating the plurality of inlet guide vanes to an open position when the ambient temperature exceeds the predetermined ambient design condition temperature; and operating a wet compression system when the ambient temperature exceeds the predetermined ambient design condition temperature.

9. The method of claim 8, wherein operating a wet compression system comprises spraying water from a plurality of spray heads.

10. The method of claim 8, wherein the step of operating a wet compression system follows the step of positioning the plurality of inlet guide vanes in an open position.

11. The method of claim 8, further comprising monitoring a compressor discharge pressure and temperature.

12. The method of claim 8, wherein the modulating and the operating steps are controlled in the context of a current cost of the level power output.

13. A compressor for a gas turbine, comprising:

a plurality of rotor wheels positioned about a compressor aft section;

the plurality of rotor wheels comprising a plurality of rotor blades;

a plurality of inlet guide vanes positioned upstream of a compressor inlet section;

a wet compression system positioned about the compressor inlet section; and a plurality of stator blades downstream of the plurality of inlet guide vanes.

14. The compressor of claim 13, wherein the plurality of inlet guide vanes comprises an open position and a fully extended position.

15. The compressor of claim 13, wherein the wet compression system comprises a plurality of spray heads.

16. The compressor of claim 13, further comprising a controller in communication with the plurality of inlet guide vanes and the wet compression system.

17. The compressor of claim 13, wherein rotor wheel comprises a low alloy material.

18. The compressor of claim 17, wherein the low alloy material comprises a NiCrMoV material.

19. The compressor of claim 17, wherein the low alloy material comprises a creep resistant material.

* * * * *